United States Patent
Ichihashi

(10) Patent No.: US 7,123,388 B2
(45) Date of Patent: Oct. 17, 2006

(54) IMAGE PROCESSING APPARATUS

(75) Inventor: Yukichika Ichihashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 10/227,011

(22) Filed: Aug. 22, 2002

(65) Prior Publication Data

US 2003/0098998 A1 May 29, 2003

(30) Foreign Application Priority Data

Aug. 22, 2001 (JP) .............................. 2001-251350
Aug. 8, 2002 (JP) .............................. 2002-231803

(51) Int. Cl.
*H04N 1/04* (2006.01)

(52) U.S. Cl. ...................... 358/483; 358/474; 358/482; 358/450; 250/208.1; 382/284

(58) Field of Classification Search ................ 358/483, 358/482, 474, 497, 473, 472, 512–514, 505, 358/450; 250/208.1; 382/284, 312; 257/290, 257/291, 225; 348/298, 294, 311, 315
See application file for complete search history.

(56) References Cited

U.S. PATENT DOCUMENTS

| 4,370,641 A | 1/1983 | Kantor et al. ............... 382/289 |
| 4,776,031 A * | 10/1988 | Mita ........................... 382/323 |
| 4,870,483 A * | 9/1989 | Nishigaki et al. ........... 358/512 |
| 5,315,412 A * | 5/1994 | Mihara et al. .............. 358/512 |
| 5,357,351 A * | 10/1994 | Nakajima et al. ........... 358/482 |
| 5,436,737 A * | 7/1995 | Nakajima et al. ........... 358/494 |
| 5,619,345 A * | 4/1997 | Machida et al. ............. 358/482 |
| 6,181,441 B1 | 1/2001 | Walsh ......................... 358/474 |
| 6,486,979 B1 * | 11/2002 | Sawada ....................... 358/483 |
| 6,610,972 B1 * | 8/2003 | Perregaux ................. 250/208.1 |
| 6,707,022 B1 * | 3/2004 | Perregaux ................. 250/208.1 |

FOREIGN PATENT DOCUMENTS

| EP | 0 946 043 A2 | 9/1999 |
| EP | 0 975 143 A2 | 1/2000 |
| JP | 2000196835 A * | 7/2000 |
| JP | 2000199702 A * | 7/2000 |

* cited by examiner

*Primary Examiner*—Cheukfan Lee
(74) *Attorney, Agent, or Firm*—Morgan & Finnegan, LLP

(57) ABSTRACT

An image processing apparatus for correction on mounting shifts among sensor chips in a contact image sensor. The apparatus has plural sensor chips each having plural pixels, arrayed in a main scanning direction, and a correction device which performs correction on a shift in the main scanning direction and/or a subscanning direction between adjacent sensor chips in a signal outputted from the plural sensor chips. The correction device performs different processing in a first sensor chip interval and a second sensor chip interval.

10 Claims, 8 Drawing Sheets

FIG. 2
PRIOR ART
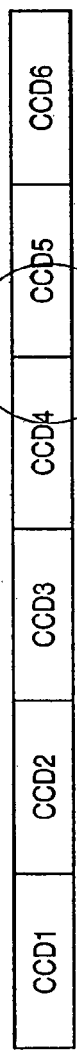
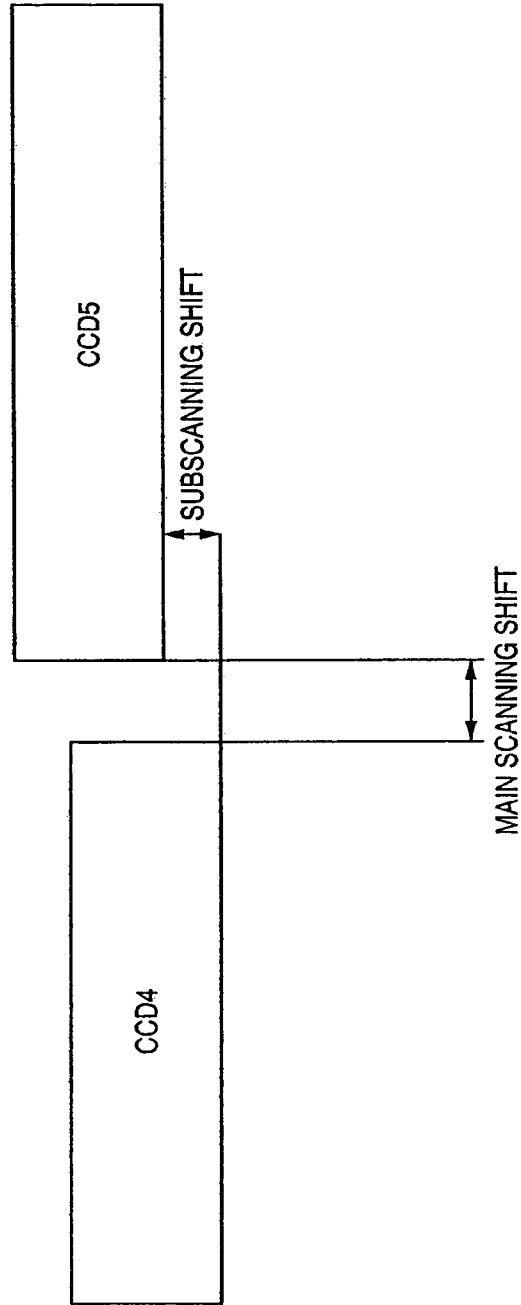

IMAGE PROCESSING APPARATUS

FIELD OF THE INVENTION

The present invention relates to an image processing apparatus having plural sensor chips, and more particularly, to a technique for correcting shifts of chips due to sensor chip attachment errors.

BACKGROUND OF THE INVENTION

Conventionally, an original image reading apparatus such as a copier uses a contact image sensor. The contact image sensor has a construction as shown in FIG. 1.

In FIG. 1, reference numeral 1 denotes a glass plate on which an original image is placed; 3, a charged-coupled device ((CCD) 1 to 6) which photoelectric-converts the original image through a cell hook lens array 2 and outputs an image signal; and 4, a CCD controller which indicates timing for outputting the image signals from the respective CCDs. The respective CCDs output the image signals in turn. The image signals are transferred through a CCD controller and an interface 5 to an image reading system.

In a tight-contact type image reading system using a contact image sensor, the distance between a photoelectric converter such as a CCD and a lens passing light is short, and the original in contact with cell hock lenses is in one-to-one correspondence with photoreception pixels of CCD. Different from generally-used compression optical system, in such one-to-one optical reading system, the length of a main scanning direction of original must be the same as that of the CCDs.

However, as the CCDs are semiconductor ICs generally manufactured from silicon wafers, the size of the CCDs is limited and CCD chips in correspondence with the size of original cannot be manufactured.

Accordingly, the contact image sensor is constructed by serially connecting CCD chips. As the CCDs respectively have a corresponding original area, the sensor can be used in the one-to-one compression optical system.

The contact image sensor having the above construction has seams between chips, and upon manufacturing of the sensor, errors of CCD chip attachment occur. The errors exist in both subscanning direction and main scanning direction as shown in FIG. 2, and shift of seam between original areas and/or pixel omission occur in a read image. The seam shift and/or pixel omission causes a shift in a fine periodical pattern such as a screened dot image, which appears as a black/white stripe in an image. Further, in a contact image sensor in which a large amount of pixel omission and/or seam shift occur, even in a general character image, a curve or the like of character is shifted and the image quality is seriously degraded.

SUMMARY OF THE INVENTION

The present invention has been proposed to solve the conventional problems, and has its object to provide an image processing apparatus which corrects the amount of shift of sensor chips such as CCDs.

According to the present invention, the foregoing object is attained by providing an image processing apparatus comprising: plural sensor chips each having plural pixels, arrayed in a main scanning direction; and a correction device that performs correction on a shift in the main scanning direction and/or a subscanning direction between adjacent sensor chips in a signal outputted from the plural sensor chips, wherein the correction device performs different processing in a first sensor chip interval and a second sensor chip interval.

Further, the foregoing object is attained by providing an image processing apparatus comprising: plural sensor chips each having plural pixels, arrayed in a main scanning direction; and a correction device that performs correction on a shift in the main scanning direction and/or a subscanning direction between adjacent sensor chips in a signal outputted from the plural sensor chips, wherein the correction device has plural correction data, and performs processing in a first sensor chip interval and a second sensor chip interval by using different correction data.

Further, the foregoing object is attained by providing an image processing apparatus comprising: plural sensor chips each having plural pixels, arrayed in a main scanning direction; and a correction device that performs correction on an area between adjacent sensor chips in a signal outputted from the plural sensor chips, wherein the correction device performs different processing in a first sensor chip interval and a second sensor chip interval.

Further, the foregoing object is attained by providing an image processing apparatus comprising: plural sensor chips each having plural pixels, arrayed in a main scanning direction; and a correction device that performs correction on an area between adjacent sensor chips in a signal outputted from the plural sensor chips, wherein the correction device has plural correction data, and performs processing in a first sensor chip interval and a second sensor chip interval by using different correction data.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is an explanatory view of seam shift between chips;

DETAILED DESCRIPTION OF THE PREFERRED EMBODIMENTS

Preferred embodiments of original image reading apparatus (image processing apparatus) of the present invention will now be described in detail in accordance with the accompanying drawings.

<First Embodiment>

Figure 7:
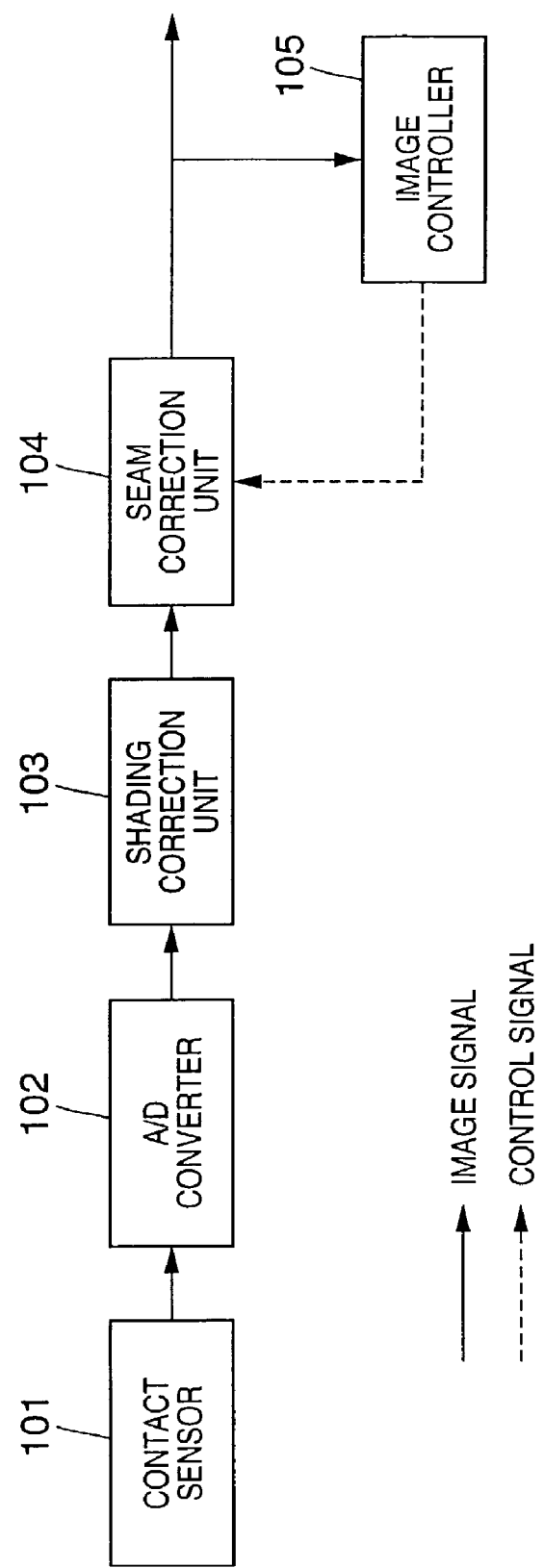
FIG. 7 is a block diagram of an original image reading apparatus according to a first embodiment of the present invention.

First, FIG. 7 shows an example of the image processing apparatus according to a first embodiment of the present invention.

Numeral 101 denotes a contact image sensor used in the present embodiment; 102, an A/D converter which converts an analog image signal from the contact image sensor 101 into a digital image signal; 103, a shading correction unit which performs shading correction processing in the original image reading apparatus to correct variation of devices in the contact image sensor; 104, a correction unit which corrects a seam shift on an original image outputted from the A/D converter 103 due to shift of the chips due to sensor chips attachment shifts in the contact image sensor; and 105, an image controller which detects the amount of chip seam shift from a signal obtained by reading a reference chart and selects an optimum correction method, and, upon actual original image reading, controls the correction unit in correspondence with the selected correction method.

First, the detection of shift chip seam shift amount and selection of correction method will be described.

Figure 1:
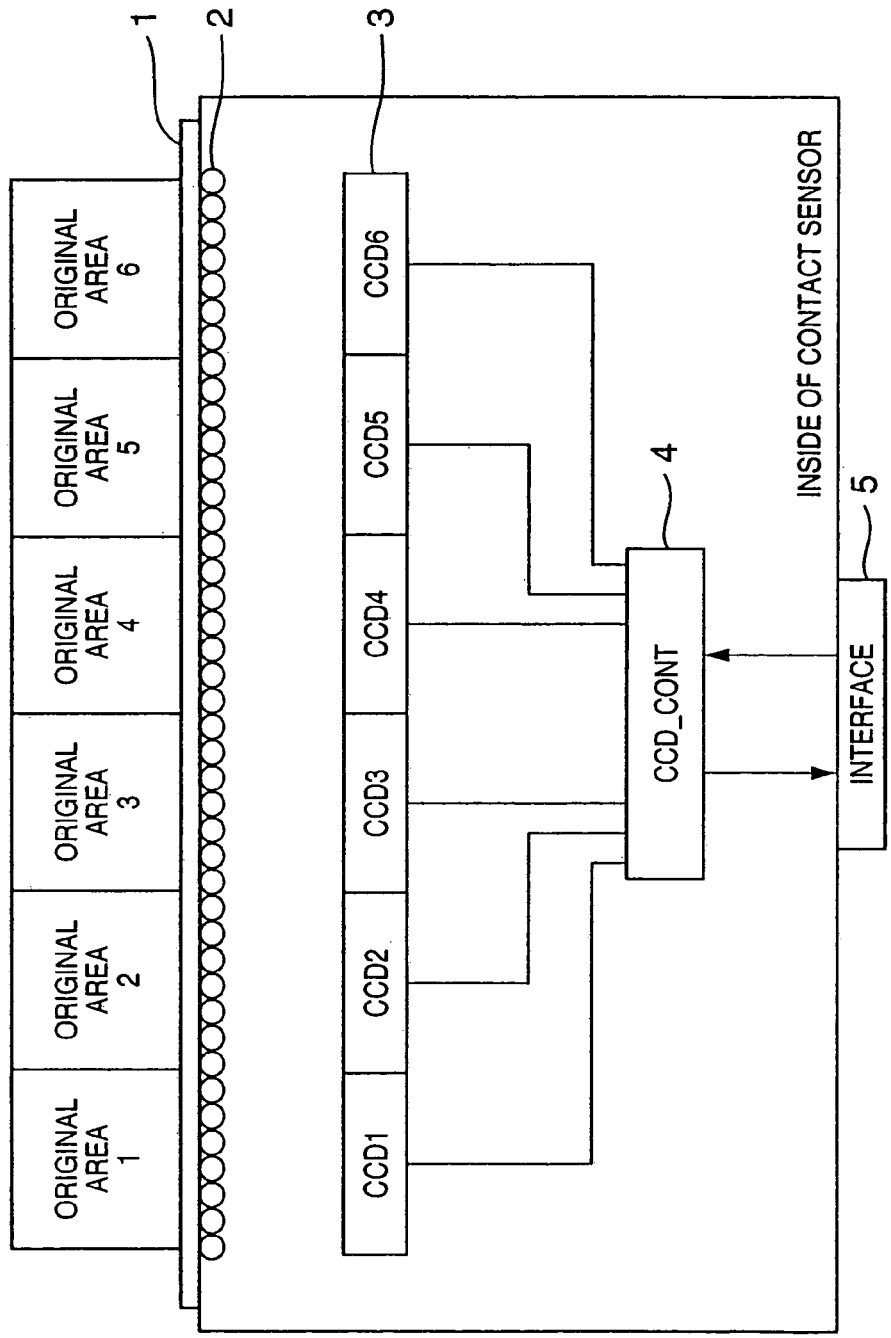
FIG. 1 is a cross-sectional view showing the constructions of contact image sensor and original image reading apparatus.
Figure 3:
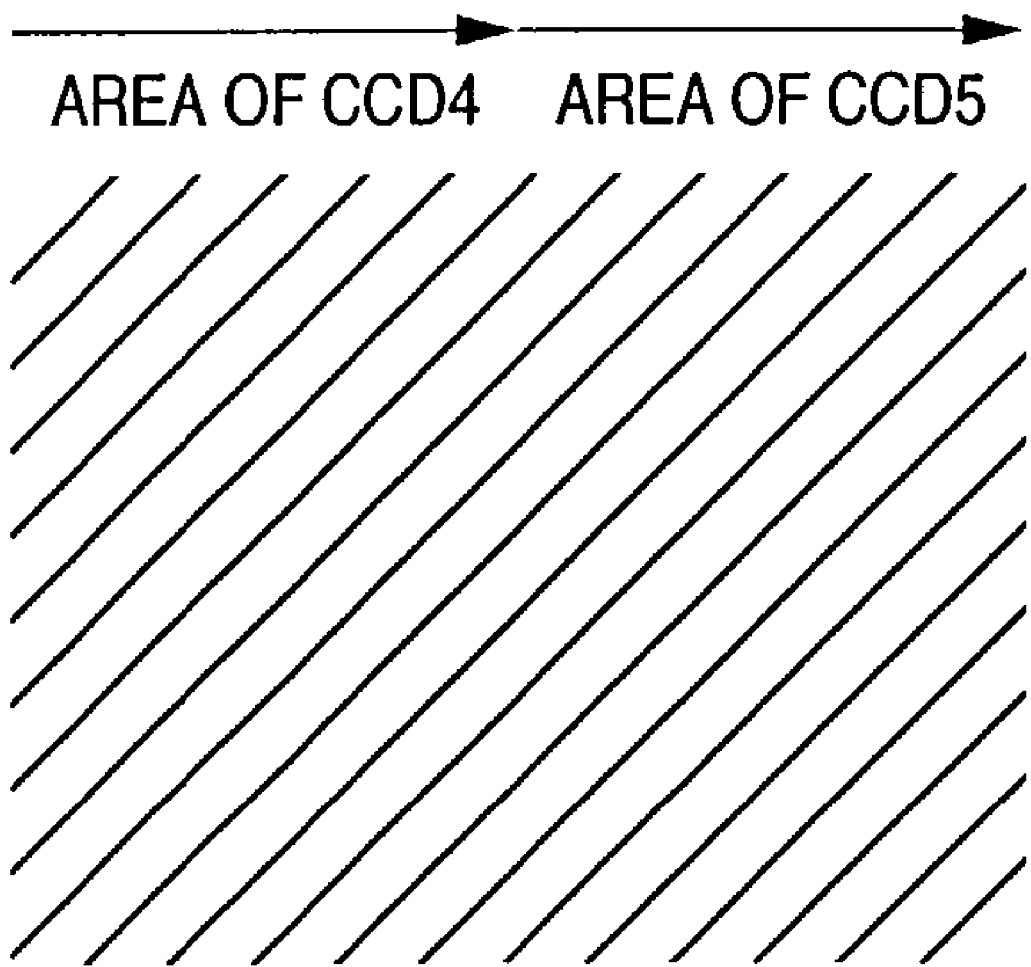
FIG. 3 an enlarged view of subscanning shift measurement chart.
Figure 4:
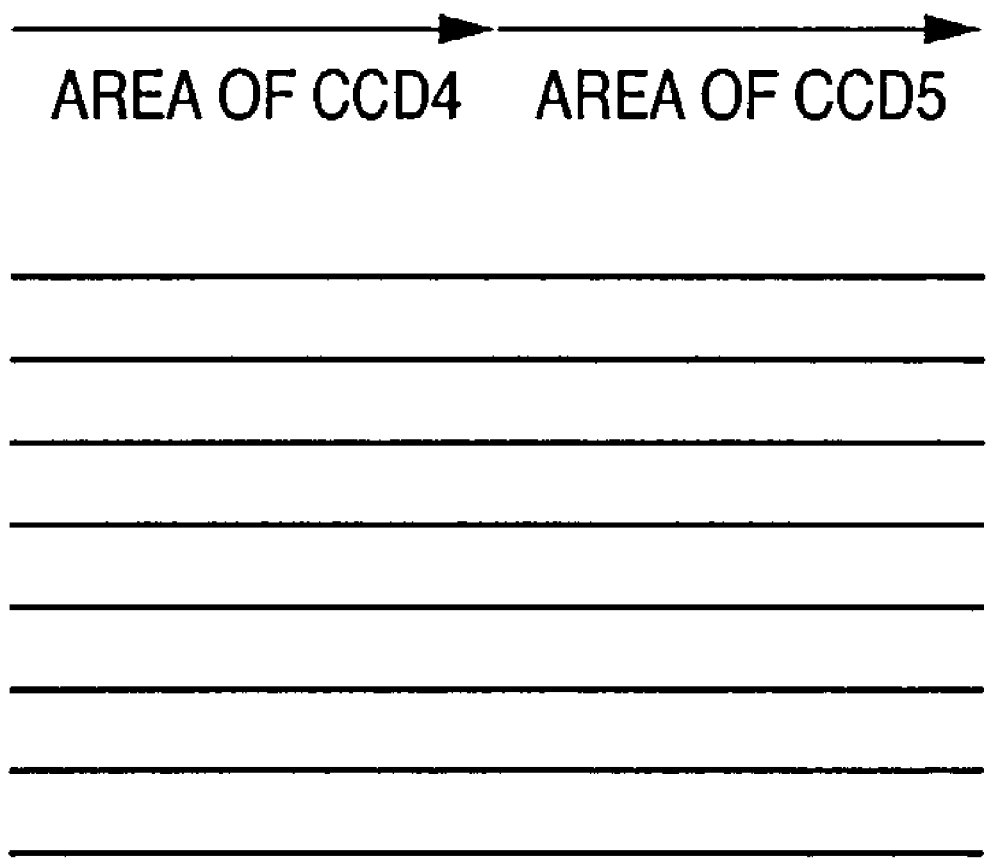
FIG. 4 is an enlarged view of main scanning shift measurement chart.

First, upon shipment from factory or in a service mode, a black and white reference original having plural lines sloped at an angle θ as shown in FIG. 3 and a black and white reference original having plural horizontal lines at equal intervals as shown in FIG. 4 are read by the image reading apparatus to which the contact image sensor (101) is attached. An analog image output from the contact image sensor 101 is converted by the A/D converter 102 to a digital image signal. Next, the digital image signal is shading-corrected by the shading correction unit 103 and sent to the seam correction unit 104.

Figure 5:
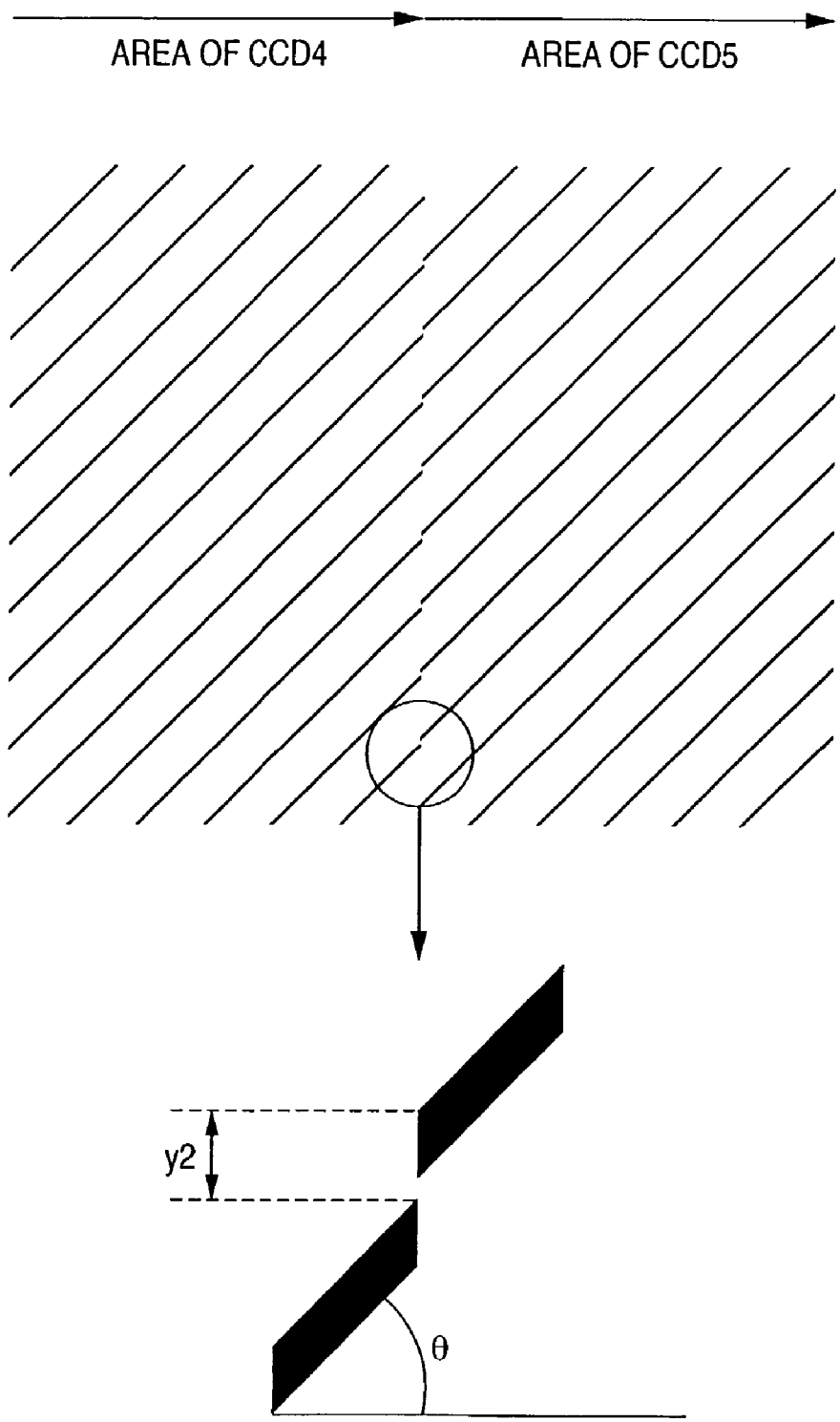
FIG. 5 is an explanatory view of y2 measurement principle.
Figure 6:
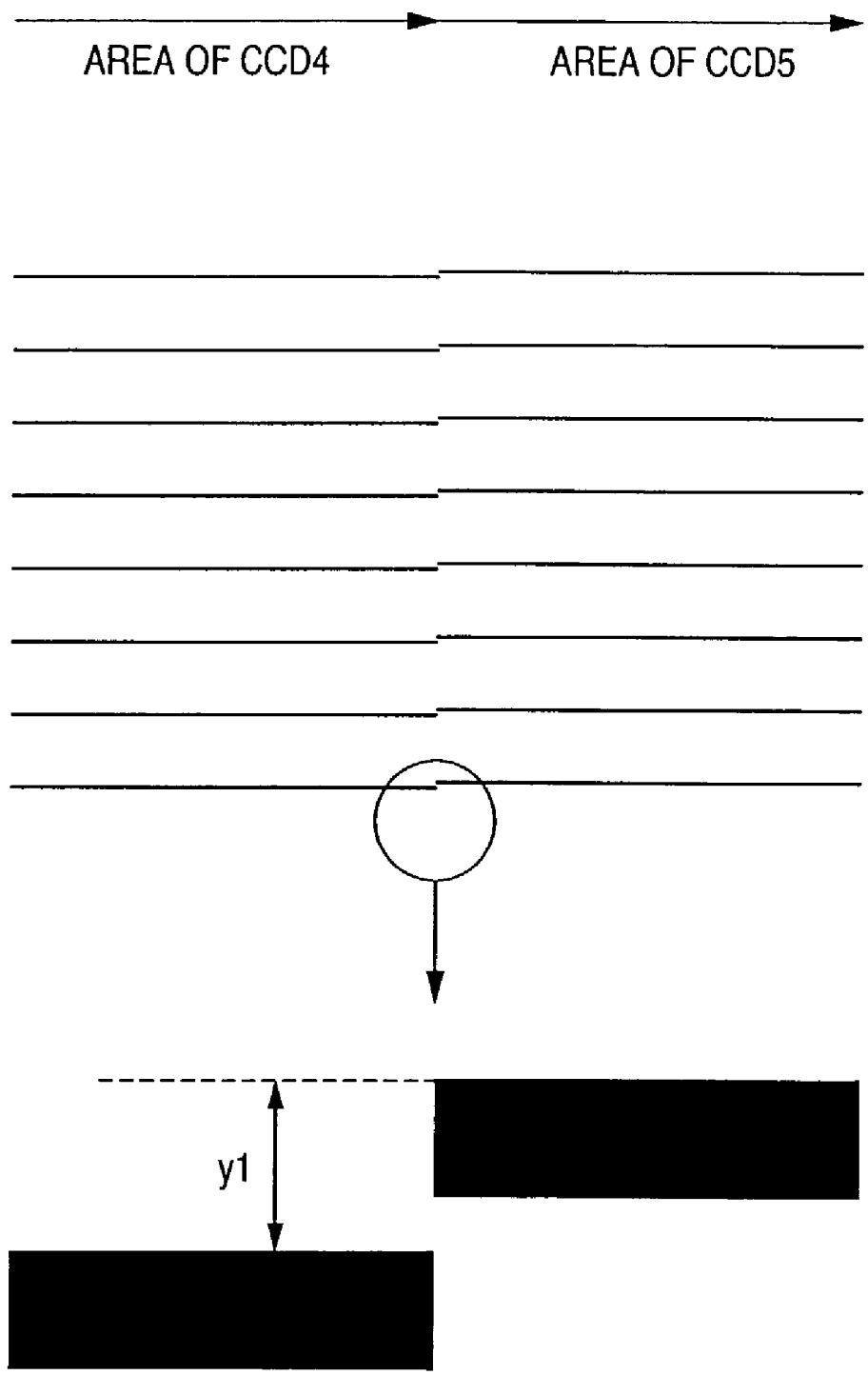
FIG. 6 is an explanatory view of y1 measurement principle.

At this time, if the seam correction unit does not perform correction, an enlarged view of the original image corresponding to the chip shift position in FIG. 3 is as shown in FIG. 5 due to the influence of chip shift, and an enlarged view of the original image corresponding to the chip shift position in FIG. 4 is as shown in FIG. 6.

Since the position where the chip shift appears corresponds to the last pixel of the previous CCD and the first pixel of the subsequent CCD, the seam of chips in the read image can be easily found by counting the number of pixels. Accordingly, the images of FIGS. 5 and 6 at the respective CCD seam portions of the contact image sensor are outputted to the image controller (105).

First, regarding the image of FIG. 6, the image controller measures the shift amount of the horizontal lines in the subscanning direction. Initially, if there is no shift in the subscanning, the output has straight horizontal lines. However, usually, the outputted lines have steps by several pixels due to the occurrence of shift in the subscanning. The speed of original feeding is lowered upon reading the horizontal line original image of FIG. 4, thereby subscanning enlargement is performed, and the chip shift in the subscanning direction can be measured more accurately. This measurement is performed plural times, and a mean value y1 of measured values is obtained.

Next, regarding the image of FIG. 5, the shift amount in the subscanning direction at a clearance of the slanted line (chip shift position). If there is no chip shift in the subscanning and main scanning directions, the sloped line has no clearance. However, actually, it has a shift by several pixels due to shift due to chip shifts in the subscanning and main scanning directions. The shift amount is measured plural time, and a mean value y2 of measured values is obtained.

At this time, assuming that the inclination of the slanted lines of the reference image is θ, the image controller performs the following calculation.

$$x1=(y2-y1)\times COS(\theta)\div SIN(\theta)$$

By the above calculation,
main scanning shift=x1
subscanning shift=y1 are obtained. The calculation is performed for the respective CCD chip seams and store the obtained results as information for correction. As the seam shifts are caused by variation of products in manufacturing process of the contact image sensor, the measurement is performed before shipment, and it is not necessary to change the measurement thereafter.

By the above process, the present original image reading apparatus obtains attachment error information in the main scanning direction (x1) and the subscanning direction (y1) among the respective chips of the contact image sensor.

However, if y1≈0 holds or x1>>y1 holds, the measurement is performed only to obtain y2. In the above expression, calculation is performed assuming that y1=0 holds, and only the value x1 is obtained, thereby the present original reading system can be simplified.

If the value y1 or x1 is greater than a value set by the system, the image controller that performed the above calculation issues a warning to the system requesting change of the contact image sensor. If the value y1 and x1 are sufficiently small, correction is performed upon original reading.

Next, an example of selection of method for correcting chip shift variation in the original image reading apparatus of the present embodiment will be described.

First, the image controller (105) prepares correction method groups for the main scanning direction by the x1 and y1 values.

The following Table 1 shows the groups for the main scanning direction.

TABLE 1

| Correction for Main Scanning Direction | |
|---|---|
| X1 (pix) | Correction method |
| 0–0.5 | no correction |
| 0.5–1.5 | correction A |
| 1.5–2.5 | correction B |
| 2.5– | warning signal |

Note that the correction A is calculating a mean value of outputs of both sides of seam i.e. the last pixel of a previous chip and the first pixel of a subsequent chip, and inserting the value into the two pixels. The correction B is inserting a mean value of outputs of the last 2 pixels of the previous chip into a position behind the previous chip, calculating a mean value of output of the first 2 pixels of the subsequent chip and inserting the value into a position in front of the subsequent chip.

Next, regarding the subscanning direction, all the values y1 among the chips are used. Using a chip attached to a position lower with respect to the subscanning direction as a reference, an attachment position y1' above the chip is obtained. The correction is made in accordance with the following Table 2 for the position y1'.

TABLE 2

Correction for Subscanning Direction

| y1' (pix) | Correction method |
|---|---|
| 0–0.5 | no correction |
| 0.5–1.5 | correction C |
| 1.5– | warning signal |

Note that the correction C is outputting, as an output of the chip, a 1-line previous value in the subscanning direction.

Then, a table indicating correspondence between correction methods and chip interval positions is generated based on the above tables.

Next, an operation of actually obtaining an original image will be described with reference to FIG. 7.

First, an original image is read by the contact image sensor 101, then an analog signal from the contact image sensor (101) is outputted to the A/D converter 102, which converts the analog image signal to a digital image signal.

Thereafter, the shading correction unit 103 performs shading correction on the digital image signal. The image signal outputted from the shading correction unit 103 having seam shifts due to chip attachment shifts in the contact image sensor is outputted to the correction unit 104.

Then the correction unit 104 corrects the shift amount of chip seams by the control signal from the image controller 105.

Hereinbelow, processing in the image controller 105 will be described.

The image controller 105 holds the table showing correspondence between chip interval positions and correction methods. More particularly, regarding the main scanning direction between the first chip and the second chip, the correction A is provided, while regarding the subscanning direction, the correction C is performed; regarding the main scanning direction between the second chip and the third chip, the correction B is provided, while regarding the subscanning direction, no correction is performed; and regarding the main scanning direction between the third chip and the fourth chip, no correction is performed, while regarding the subscanning direction, the correction C is provided.

Then, the control signal is sent to the seam correction unit 104 so as to perform correction corresponding to the above table. The image controller 105 controls the seam correction unit 104 to perform the above two types (the main scanning direction and the subscanning direction) of corrections based on the control methods selected from the corrections A to C or no correction while counting the number of output pixels.

Then, the image corrected by the seam correction unit 104 is outputted from the original image reading apparatus of the present embodiment.

<Second Embodiment>

Next, another embodiment of the present invention will be described. In the above-described first embodiment, the measurement of the values x1, y1 and y2 is made on the premise of actual recording. However, in this process, the values are specific to the respective contact image sensors as described in the first embodiment, and it is not conceivable that the values are varied except special cases (a large amount of thermal expansion or shock).

Figure 8:
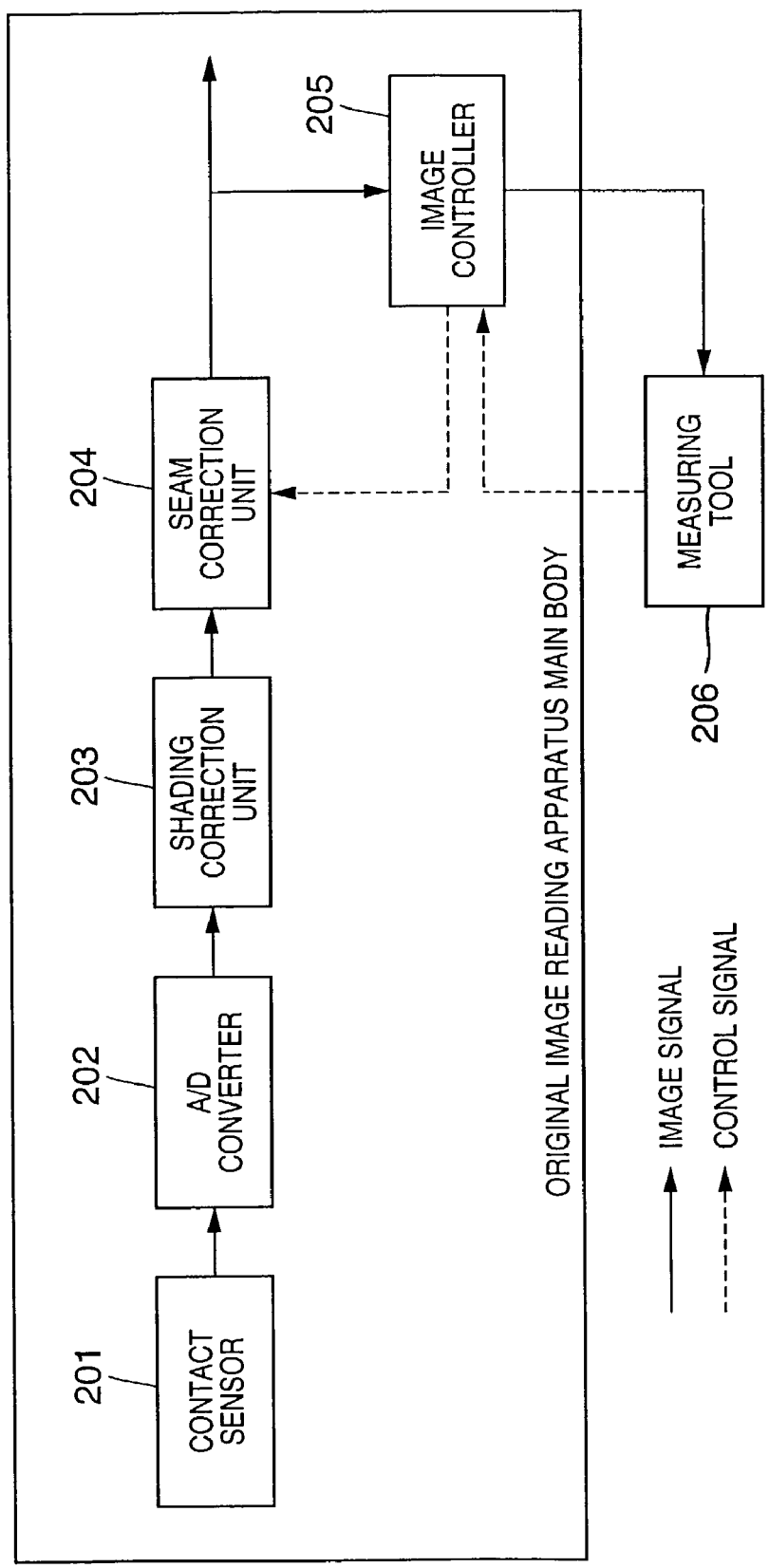
FIG. 8 is a block diagram of the original image reading apparatus according to a second embodiment of the present invention.

Accordingly, the process of measurement of the values y1, y2 and x1 described in the first embodiment can be realized by measurement by using specialized measuring tools upon production, and a correction table can be downloaded. FIG. 8 is a block diagram in this case.

Numeral 201 denotes a contact image sensor used in the present embodiment; 202, an A/D converter which converts an analog image signal from the contact image sensor (201) to a digital image signal; 203, a shading correction unit which performs shading correction processing in the present original image reading apparatus to correct variation of devices in the contact image sensor; 204, a correction unit which corrects the original image outputted from the shading correction unit 203 having seam shifts due to chip attachment shifts in the contact image sensor; 205, an image controller which sends a correction instruction to the correction unit 204 upon original reading in accordance with information downloaded by a tool (206) to be described later; and 206, a measuring tool connected to the image reading apparatus main body before shipment from factory, which performs measurement of attachment errors among the respective chips and the values y1, y2 and x1, and uploads information of the Tables 1 and 2 of the first embodiment showing corrections for chip interval positions for the image controller 205.

In the second embodiment, the original image reading apparatus reads the charts of FIGS. 3 and 4, then the measuring tool 206 obtains the values y1, y2 and x1 by similar calculations to those of the first embodiment.

Next, the measuring tool 206 uploads the Tables 1 and 2 for determining corrections for respective chip interval positions to a memory area of the image controller 205.

Thus the process upon shipment from factory is completed.

Thereafter, when an actual original reading operation is performed, the correction methods in the first embodiment may be used. Further, an example of second seam correction method will be described.

The second seam correction is made by using a filter.

In the present embodiment, the filter is a 3×3 matrix as follows.

A, B, C
D, E, F
G, H, I

Using this filter, processing is performed on pixels on the both ends of chip existing at the seam and peripheral pixels P11 to P34.

P11, P12, P13, P14
P21, P22, P23, P24
P31, P32, P33, P34

At this time, the pixels P22 and P32 are pixels of interest in the present image processing. Further, the pixel P12 is a last pixel of previous chip in a previous line; the pixel P22, a last pixel of previous chip of line of interest; the pixel P32, a last pixel of previous chip in a subsequent line; the pixel P13, an first pixel of subsequent chip in the previous line; the pixel P23, an first pixel of the subsequent chip in the line of interest; the pixel P33, an first pixel of the previous chip in the subsequent line; and pixels P11, P21, P31, P14, P24 and P34, the peripheral pixels.

A filter A is determined based on the values x1 and y1' obtained by the above-described method. For example, the correction A is selected from the Table 1 by the value x1 for 1 pix. Further, the correction C is selected from the Table 2 by the value y1' for 1 pix.

At this time, as the correction A and the correction C are selected, a filter 1 as an optimum filter is selected. Regarding the filter, appropriate filters are prepared in correspondence with the number of selections from the Table 1 and the Table 2. In the present embodiment, 3 patterns (no correction, correction A and correction B) for the Table 1 and 2 patterns (no correction and correction C) for the Table 2 are provided, i.e., total 6 patterns are provided.

For example, the components of the selected filter 1 are as follows.

| | |
|---|---|
| A, B, C | 2, 5, 2 |
| D, E, F = | 3, 20, 3 |
| G, H, I | 2, 5, 2 |

As generation of this filter, it is desirable that if the value x1 is large, large numbers are selected for main scanning directional components, i.e., D and F, and further, if the value y1' is large, large numbers are selected for subscanning directional components, i.e., B and H.

Otherwise, values A to I may be directly obtained from the values of x1 and y1' independent of generation of table by the Table 1 and the Table 2 as follows.

$$A=x1+y1', B=5*y1', C=x1+y1', D=3*x1, E=20, F=3*x1,$$
$$G=x1+y1', H=5*y1', I=3*x1$$

This enables generation of further optimum filter independent of the status upon generation of table in designing.

The values of the pixels of interest P22 and P23 are obtained by using the filter 1 as follows.

$$P22' = (AxP11 + BxP12 + CxP13 + DxP21 + ExP22 + FxP23 +$$
$$GxP31 + HxP32 + IxP33) \div (A + B + C + D + E + F +$$
$$G + H + I)$$
$$P23' = (AxP12 + BxP13 + CxP14 + DxP22 + ExP23 + FxP24 +$$
$$GxP32 + HxP33 + IxP34) \div (A + B + C + D + E + F +$$
$$G + H + I)$$

(A to I are numerical values constructing the filter 1)

Such filter is selected for each chip seam, and the seam correction unit 204 performs correction on the seams sequentially.

Next, an actual operation for obtaining an original image will be described with reference to FIG. 8.

First, an original image is read by the contact image sensor 201, then an analog image signal from the contact image sensor 201 is outputted to the A/D converter 202, which converts the analog image signal to a digital image signal.

Thereafter, the shading correction unit 203 performs shading correction processing on the image signal having shifts due to chip attachment shifts in the contact image sensor outputted from the A/D converter 202.

Then the correction unit 204 performs correction on the chip seam shifts based on the control signal from the image controller 205.

Hereinbelow, processing in the image controller 205 will be described.

The image controller 205 holds the table showing correspondence between chip interval positions and correction methods. More particularly, regarding the first chip and the second chip, the filter 1 is provided, regarding the second chip and the third chip, the filter 2 is provided, and regarding the third chip and the fourth chip, the filter 3 is provided. As described above, 6 patterns of filters are provided in correspondence with the respective chip interval positions.

Then, the control signal is sent to the seam correction unit 204 so as to perform correction corresponding to the above table.

Then, the respective chip interval portions are corrected based on the corresponding table (where any of the filters 1 to 6 are provided).

The image corrected by the seam correction unit 104 is outputted from the original image reading apparatus of the present embodiment.

As described above, in a case where plural sensor chips are provided on a substrate in accordance with the above-described embodiments, image shifts due to chip attachment errors specific to this type of image sensor are prevented, thus an image processing apparatus which outputs a higher definition image can be provided.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   plural sensor chips each having plural pixels, arrayed in a main scanning direction; and
   a correction device that performs correction of a shift in the main scanning direction and a subscanning direction between adjacent sensor chips in a signal outputted from said plural sensor chips,
   wherein said correction device has plural filters having different matrices, and performs different processing for the signals outputted from a first sensor chip and a second sensor chip by using different filters.

2. The image processing apparatus according to claim 1, wherein said correction device performs the processing by using signals from adjacent respective sensor chips.

3. The image processing apparatus according to claim 1, further comprising a detection device that detects an amount of mounting shift between adjacent sensor chips by using an image obtained from the plural arrayed sensor chips.

4. The image processing apparatus according to claim 1, wherein if an amount of mounting shift between said plural sensor chips is equal to or greater than a predetermined value, a warning is made.

5. An image processing apparatus comprising:
   plural sensor chips each having plural pixels, arrayed in a main scanning direction; and
   a correction device that performs correction on a shift in the main scanning direction and a subscanning direction between adjacent sensor chips in a signal outputted from said plural sensor chips,
   wherein said correction device has plural filters having different matrices, and performs processing for the signals outputted from a first sensor chip and a second sensor chip by using different filters.

6. The image processing apparatus according to claim 5, wherein said correction device performs the processing by using signals from adjacent respective sensor chips.

7. An image processing apparatus comprising:
   plural sensor chips each having plural pixels, arrayed in a main scanning direction; and a correction device that performs correction on an area between adjacent sensor chips in a signal outputted from said plural sensor chips, wherein said correction device has plural filters having different matrices, and performs different processing for the signals outputted from a first chip and a second sensor chip by using different filters.

8. The image processing apparatus according to claim 7, wherein said correction device interpolates said area using signals from adjacent respective sensor chips.

9. An image processing apparatus comprising:

plural sensor chips each having plural pixels, arrayed in a main scanning direction; and a correction device that performs correction on an area between adjacent sensor chips in a signal outputted from said plural sensor chips, wherein said correction device has filters having different matrices, and performs processing for the signals outputted from a first sensor chip and a second sensor chip by using different filters.

10. The image processing apparatus according to claim 9, wherein said correction device interpolates said area by using signals from adjacent respective sensor chips.

* * * * *